(12) United States Patent
Matsuoka et al.

(10) Patent No.: US 8,034,493 B2
(45) Date of Patent: Oct. 11, 2011

(54) ION EXCHANGE MEMBRANE AND PRODUCTION PROCESS THEREFOR

(75) Inventors: Hitoshi Matsuoka, Shunan (JP); Kenji Fukuta, Shunan (JP)

(73) Assignee: Tokuyama Corporation, Shunan-shi (JP)

( * ) Notice: Subject to any disclaimer, the term of this patent is extended or adjusted under 35 U.S.C. 154(b) by 1154 days.

(21) Appl. No.: 11/802,502

(22) Filed: May 23, 2007

(65) Prior Publication Data
US 2007/0225386 A1    Sep. 27, 2007

Related U.S. Application Data

(62) Division of application No. 10/743,146, filed on Dec. 23, 2003, now abandoned.

(30) Foreign Application Priority Data

Dec. 26, 2002 (JP) .................................. 2002-377454

(51) Int. Cl.
*H01M 8/10* (2006.01)
*H01M 2/16* (2006.01)
(52) U.S. Cl. ........................................ 429/408; 429/492

(58) Field of Classification Search .................. 429/408, 429/479, 492
See application file for complete search history.

(56) References Cited

U.S. PATENT DOCUMENTS
4,604,170 A    8/1986   Miyake et al.
6,465,136 B1   10/2002  Fenton et al.

FOREIGN PATENT DOCUMENTS
| JP | 61-130347 A | 6/1986 |
| JP | 61-181839 A | 8/1986 |
| JP | 6-111827 A | 4/1994 |
| JP | 9-235399 A | 9/1997 |
| JP | 11-310649 A | 11/1999 |
| JP | 2001-135328 A | 5/2001 |
| JP | 2002-338721 A | 11/2002 |

*Primary Examiner* — Tracy Dove
(74) *Attorney, Agent, or Firm* — Birch, Stewart, Kolasch & Birch, LLP (57) ABSTRACT

There is provided an ion exchange membrane and preparation process thereof. The membrane has a porous film layer having pores with an average pore diameter of 0.01 to 2 μm and a surface layer existent on at least one side of the porous film. The pores of the porous film layer are filled with an ion exchange resin and the surface layer contains (a) an inorganic filler having an average primary particle longest diameter which is 0.1 time or more the average pore diameter of the pores of the porous film layer and 50 μm or less and (b) an ion exchange resin. The membrane is useful for a diaphragm of a direct methanol type fuel cell.

2 Claims, 1 Drawing Sheet

ION EXCHANGE MEMBRANE AND PRODUCTION PROCESS THEREFOR

This application is a Divisional Application of application Ser. No. 10/743,146 filed on Dec. 23, 2003 now abandoned, and for which priority is claimed under 35 U.S.C. §120; and this application claims priority of Application No. 2002-377454 filed in Japan on Dec. 26, 2002 under 35 U.S.C. §119; the entire contents of all are hereby incorporated by reference.

BACKGROUND OF THE INVENTION

1. Field of the Invention

The present invention relates to an ion exchange membrane for use as a diaphragm for cells and dialysis and for use in sensors, specifically an ion exchange membrane advantageously used as a diaphragm for a direct methanol type fuel cell and to a production process therefor.

2. Description of the Prior Art

An ion exchange membrane is widely used as a diaphragm for cells such as solid polymer type fuel cells, redox flow cells and zinc-bromine cells and as a diaphragm for dialysis. Out of these, a solid polymer type fuel cell which comprises an ion exchange membrane as an electrolyte is one of clean and highly efficient generation systems which take out chemical energy generated from a reaction between continuously supplied fuel and an oxidizing agent as electric power and its importance is growing in the fields of automobiles, home electric appliances and portable devices because it operates at a low temperature and is small in size. The solid polymer type fuel cell is generally constituted such that a gas diffusion electrode carrying a catalyst is joined to both sides of a solid polymer diaphragm which functions as an electrolyte. Fuel which is a hydrogen gas or methanol is supplied into a chamber (fuel chamber) where one of the gas diffusion electrodes is existent whereas oxygen or an oxygen-containing gas such as air is supplied as an oxidizing agent into a chamber where the other gas diffusion electrode is existent, and an external load circuit is connected between the gas diffusion electrodes. Thus the solid polymer type fuel cell serves as a fuel cell. A direct methanol type fuel cell which uses methanol as a direct fuel is easy to handle as the fuel is liquid, inexpensive and expected to be used as a relatively low output power source for portable devices.

Figure 1:
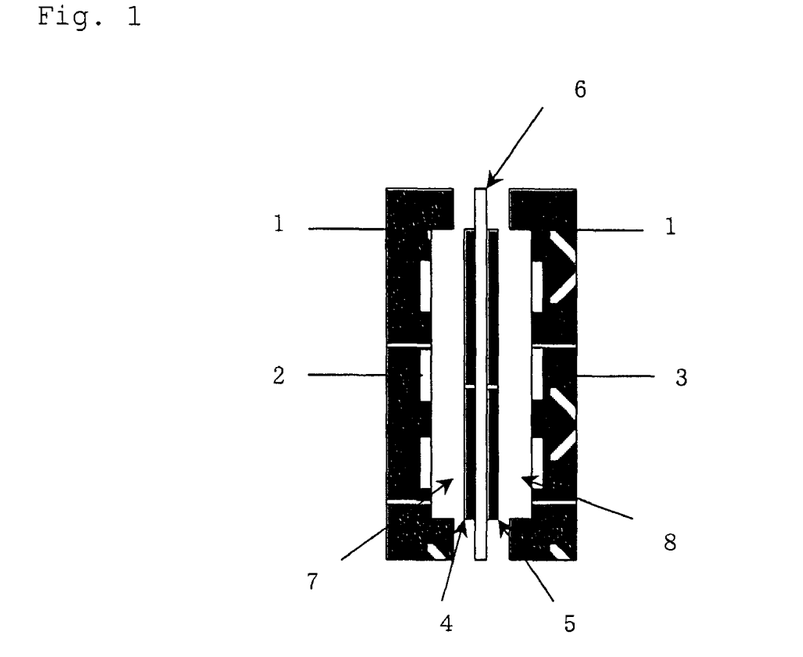
FIG. 1 is a conceptual diagram showing the basic structure of a direct methanol type fuel cell.

The basic structure of this direct methanol type fuel cell is shown in FIG. 1. In FIG. 1, (1) denotes a cell interstructure, (2) a fuel flow hole, (3) an oxidizing gas flow hole, (4) a diffusion electrode on the fuel chamber side, (5) a gas diffusion electrode on the oxidizing agent chamber side, and (6) a solid polymer electrolyte membrane. In this direct methanol type fuel cell, protons (hydrogen ions) and electrons are produced from methanol supplied into a fuel chamber (7) on the fuel chamber side diffusion electrode (4), and the protons move to the oxidizing agent chamber (8) through the solid polymer electrolyte (6) to be reacted with oxygen contained in air or oxygen gas to produce water. At this point, electrons produced on the fuel chamber side diffusion electrode (4) move to the oxidizing agent chamber side gas diffusion electrode (5) through the external load circuit, thereby obtaining electric energy.

In the direct methanol type fuel cell having the above structure, a cation exchange membrane is generally used as the above diaphragm. The cation exchange membrane must have low electric resistance, high physical strength and low permeability of methanol used as fuel. When an ion exchange membrane having high methanol permeability is used as a diaphragm for a fuel cell, it is impossible to completely prevent methanol in the fuel chamber from being diffused into the oxidizing agent chamber and it is difficult to obtain high output from the cell.

A perfluorocarbon sulfonic acid membrane has been mainly used as the cation exchange membrane used as a diaphragm for a direct methanol type fuel cell. Although this membrane has excellent chemical stability, it does not have sufficiently high physical strength, thereby making it difficult to reduce electric resistance by decreasing the membrane thickness. In addition, when methanol is used as fuel, the perfluorocarbon sulfonic acid film greatly expands and deforms and the diffusion of methanol into the oxidizing agent chamber cannot be completely suppressed. Further, the perfluorocarbon sulfonic acid film is very expensive.

Further, it is proposed that a cation exchange membrane having low electric resistance and extremely low gas permeability may be manufactured as a diaphragm for a solid polymer type fuel cell by impregnating and polymerizing a polyolefin-based or polyfluorocarbon-based resin porous film with a monomer having a functional group capable of introducing a cation exchange group (see JP-A 2001-135328 and JP-A 11-310649) (the term "JP-A" as used herein means an "unexamined published Japanese patent application"). However, when the cation exchange membrane is used as a diaphragm for a solid polymer type fuel cell which uses a hydrogen gas as fuel, the above effect is observed whereas when it is used as a diaphragm for a direct methanol type fuel cell, methanol permeability cannot be completely suppressed, thereby causing the diffusion of methanol into the oxidizing agent chamber with the result of deteriorated cell performance.

Meanwhile, in order to improve the water retention properties and ion conductivity of the ion exchange membrane, there is proposed a film prepared by uniformly dispersing silica particles or silica whiskers into an ion exchange membrane (for example, JP-A 6-111827). Although water retention properties and ion conductivity are improved by this method, studies conducted by the inventors of the present invention reveal that methanol permeability does not change or becomes worse in a case.

Thus, a cation exchange membrane which has low methanol permeability and low electric resistance (high ion conductivity) has been unknown as the cation exchange membrane which is used as a diaphragm for a direct methanol type fuel cell.

SUMMARY OF THE INVENTION

It is an object of the present invention to provide an ion exchange membrane which has low liquid permeability, particularly low methanol permeability, low membrane resistance and can obtain high output stably when it is used as a diaphragm for a direct methanol type fuel cell.

It is another object of the present invention to manufacture the above high-performance ion exchange membrane efficiently and advantageously.

It is still another object of the present invention to provide a direct methanol type fuel cell which comprises the above ion exchange membrane of the present invention as a diaphragm.

Other objects and advantages of the present invention will become apparent from the following description.

According to the present invention, firstly, the above objects and advantages of the present invention are attained by an ion exchange membrane which comprises:

(A) a porous film layer having pores with an average pore diameter of 0.01 to 2 μm; and (B) a surface layer existent on at least one side of the porous film, wherein the pores of the porous film layer (A) are filled with an ion exchange resin and the surface layer comprises (a) an inorganic filler having a primary particle average longest diameter which is 0.1 time or more the average pore diameter of the pores of the porous film layer and 50 μm or less and (b) an ion exchange resin.

According to the present invention, secondly, the above objects and advantages of the present invention are attained by a process for producing the ion exchange membrane of the present invention (may be referred to as "first production process" hereinafter), comprising the steps of:

(1) contacting a porous film having pores with an average pore diameter of 0.01 to 2 μm to a suspension containing an inorganic filler having an average primary particle longest diameter which is 0.1 time or more the average pore diameter of the pores of the porous film and 50 μm or less and a polymerizable monomer selected from the group consisting of a polymerizable monomer which provides an ion exchange resin when it is polymerized and a polymerizable monomer which provides an ion exchange resin precursor when it is polymerized in order to infiltrate the suspension into the pores of the porous film and to adhere the suspension to the surface of the porous film;

(2) polymerizing the polymerizable monomer contained in the suspension in the pores and on the surface of the porous film; and (3) converting the ion exchange resin precursor into an ion exchange resin when the ion exchange resin precursor is obtained by polymerization in the above step (2).

According to the present invention, thirdly, the above objects and advantages of the present invention are attained by a process for producing the ion exchange membrane of the present invention (may be referred to as "second production process" hereinafter), comprising the steps of:

(1) contacting a porous film having pores with an average pore diameter of 0.01 to 2 μm to a suspension containing an inorganic filler having an average primary particle longest diameter which is 0.1 time or more the average pore diameter of the pores of the porous film and 50 μm or less, a resin selected from the group consisting of an ion exchange resin and an ion exchange resin precursor, and a solvent in order to infiltrate the suspension into the pores of the porous film and to adhere the suspension to the surface of the porous film;

(2) removing the solvent contained in the suspension in the pores and on the surface of the porous film; and (3) converting the ion exchange resin precursor into an ion exchange resin when the suspension in the step (2) contains the ion exchange resin precursor.

According to the present invention, in the fourth place, the above objects and advantages of the present invention are attained by a diaphragm for a direct methanol type fuel cell which comprises the ion exchange membrane of the present invention.

According to the present invention, in the fifth place, the above objects and advantages of the present invention are attained by a direct methanol type fuel cell which comprises the diaphragm for a direct methanol type fuel cell of the present invention.

DETAILED DESCRIPTION OF THE PREFERRED EMBODIMENTS

The present invention will be described in detail hereinbelow. A description is first given of the ion exchange membrane of the present invention.

In the ion exchange membrane of the present invention, the porous film layer (A) has pores having an average pore diameter of 0.01 to 2 μm. The porous film may be any known porous film in which at least some of the pores extend from the front side to the rear side of the film so that an ion exchange membrane comprising the porous film as a substrate can be formed.

When the average pore diameter of the pores is smaller than 0.01 μm, the filling of the ion exchange resin into the pores of the porous substrate becomes unsatisfactory, thereby obtaining a film having high electric resistance and when the average pore diameter is larger than 2 μm, high methanol impermeability cannot be obtained. The average pore diameter is preferably 0.01 to 1 μm.

The average pore diameter of the pores of the porous film is measured in accordance with a bubble point method (JIS K3832).

To reduce the electric resistance and maintain the high physical strength of the ion exchange membrane, the void volume (also called "porosity") of the porous film layer (A) is preferably 20 to 95%, particularly preferably 30 to 90%. The gas permeability (JIS P-8117) of the porous film layer (A) is preferably 1,000 sec or less, particularly preferably 500 sec or less. The thickness of the porous film layer (A) is preferably 5 to 150 μm, more preferably 10 to 120 μm, particularly preferably 10 to 70 μm.

The porous film of the porous film layer (A) is not limited to a particular form and may be a porous oriented film, porous non-oriented film, fabric, nonwoven fabric, paper or inorganic film. The material of the porous film is selected from a thermoplastic resin composition, thermosetting resin composition, inorganic material and a mixture thereof. Out of these, a thermoplastic resin composition is preferred because it is easily produced and has high adhesion strength to a hydrocarbon-based ion exchange resin which will be described hereinafter. Examples of the thermoplastic resin composition include polyolefin resins such as α-olefin homopolymers and copolymers including ethylene, propylene, 1-butene, 1-pentene, 1-hexene, 3-methyl-1-butene, 4-methyl-1-pentene and 5-methyl-1-heptene; vinyl chloride-based resins such as polyvinyl chloride, vinyl chloride-vinyl acetate copolymer, vinyl chloride-vinylidene chloride copolymer and vinyl chloride-olefin copolymer; fluororesins such as polytetrafluoroethylene, polychlorotrifluoroethylene, vinylidene polyfluoride, tetrafluoroethylene-hexafluoropropylene copolymer, tetrafluoroethylene-perfluoroalkylvinyl ether copolymers and tetrafluoroethylene-ethylene copolymer; and polyamide resins such as nylon 6 and nylon 66. Out of these, polyolefin resins are preferred because they have excellent mechanical strength, chemical stability and chemical resistance and high affinity for hydrocarbon-based ion exchange resins. Out of the polyolefin resins, polyethylene and polypropylene resins are particularly preferred and polyethylene resin is the most preferred.

Further, a polyolefin resin porous oriented film is preferred and a polyethylene resin porous oriented film is particularly preferred as the above porous film because they have the above average pore diameter, are easy to obtain and are superior in strength.

The above porous oriented film can be obtained by methods disclosed by JP-A 9-235399, JP-A 2002-338721 and the like. Commercially available products (such as Hipore of Asahi Chemical Industry Co., Ltd., U-pore of Ube Industries, Ltd., Setera of Tonen Tapils Co., Ltd., Excelpor of Nitto Denko Corporation, Hilet of Mitsui Chemicals, Inc.) may also be used.

In the ion exchange membrane of the present invention, the porous film layer (A) may consist of a single layer or a plurality of layers.

The ion exchange membrane of the present invention has on at least one side of the above porous film layer (A) as a substrate a surface layer containing an inorganic filler having an average primary particle longest diameter which is 0.1 time or more the average pore diameter of the pores of the porous film layer (A) and 50 μm or less (to be simply referred to as "inorganic filler" hereinafter) and an ion exchange resin. When the longest diameter (length of a portion having the longest diameter of a filler particle) of the inorganic filler is smaller than 0.1 time the average pore diameter of the pores of the porous film layer (A), methanol permeability cannot be reduced or film resistance becomes high, thereby making it impossible to obtain an ion exchange membrane having low methanol permeability and low electric resistance which the present invention is directed to. When the longest diameter is larger than 50 μm, it is extremely difficult to produce an ion exchange membrane and even if it is produced, the suppression of methanol permeability will become unsatisfactory. The longest diameter is preferably 0.2 time or more the average pore diameter of the pores of the porous film layer (A) and 10 μm or less.

The form of the inorganic filler is spherical, fibrous, lamellar (film-like) or like a ground product having no fixed form. Out of these, it is preferably lamellar because a lamellar inorganic filler can show satisfactory methanol impermeability. Further, the most preferred lamellar particle has an aspect ratio of 50 to 2,000, particularly 200 to 1,000.

The aspect ratio of the lamellar particle is the ratio of the thickness to the longest diameter (the length of a portion having the longest diameter of the particle) of the lamellar particle which can be obtained by observation through an electron microscope.

Preferably, the material of the inorganic filler has hydrophilic nature and corrosion resistance even in the presence of an ion exchange group such as sulfonic acid group or amino group with a view to high ion conductivity and the durability of the ion exchange membrane. A powder of an oxide, composite oxide, hydroxide, carbonate, sulfate or silicate of at least one metal selected from the group consisting of metals of the groups IIA, IVA, IIIB and IVB of the periodic table or a mixture thereof may be used. The metal of the group IIA of the periodic table is preferably calcium or magnesium, the metal of the group IVA is preferably titanium or zirconium, the metal of the group IIIB is preferably aluminum, and the metal of the group IVB is preferably silicon. Examples of the inorganic filler which can be advantageously used in the present invention include silicates such as montmorillonite and talc; oxides such as silicon oxide (silica), aluminum oxide (alumina) and titanium oxide; carbonates such as calcium carbonate, magnesium carbonate and barium carbonate; hydroxides such as magnesium hydroxide, calcium hydroxide and aluminum hydroxide; and sulfates such as calcium sulfate, barium sulfate and aluminum sulfate. Out of these, at least one inorganic filler selected from the group consisting of silicates, silica, aluminum and titanium oxide is particularly preferred.

Examples of the lamellar particle of the above material include natural and artificial minerals such as montmorillonite, bentonite, smectite, hectorite, beidellite, sauconite, perovskite, saponite, kaolin, sericite, mica, talc and lamellar silicate.

These inorganic filler may be treated with a silane coupling agent (e.g. alkyltrialkoxy silane, dialkyldialkoxy silane, alkyltrichloro silane) or surface active agent (e.g. tetraalkylammonium salt or alkysulfonate salt).

An ion exchange resin having an ion exchange group with cation exchangeability or anion exchangeability is used as the ion exchange resin.

The ion exchange resin is preferably a resin essentially composed of carbon and hydrogen except for its ion exchange group because its production cost is lower than that of perfluorocarbon sulfonic acid or the like and electric resistance can be lowered by reducing the film thickness due to its high affinity for the substrate which is a polyolefin porous film having high strength. A small amount of other atom such as fluorine, chlorine, bromine, oxygen, nitrogen, silicon, sulfur, boron or phosphorus may be existent in a portion other than the ion exchange group of the ion exchange resin. The amount of the atom is preferably 40 mol % or less, particularly preferably 10 mol % or less based on the total number of atoms constituting the portion other than the ion exchange group (this ion exchange resin may be referred to as "hydrocarbon-based ion exchange resin"). It is particularly preferably a copolymer of a styrene-based polymerizable monomer and a crosslinkable monomer copolymerizable with the styrene-based polymerizable monomer.

Examples of the ion exchange group include cation exchange groups such as sulfonic acid group, carboxylic acid group and phosphonic acid group. Out of these, sulfonic acid group which is a strong acidic group is particularly preferred. Examples of the anion exchange group include primary to tertiary amino groups, quaternary ammonium group, pyridyl group, imidazole group, quaternary pyridinium group and quaternary imidazolium group. Out of these, quaternary ammonium group and quaternary pyridinium group which are strong basic groups are preferred.

The thickness of the surface layer which contains an inorganic filler and an ion exchange resin can be suitably adjusted according to application purpose. To obtain satisfactory methanol impermeability and high ion conductivity, the thickness is preferably 0.05 to 5 μm, more preferably 0.1 to 3 μm. The weight ratio of the inorganic filler to the ion exchange resin in the layer is preferably 1:100 to 70:100, more preferably 1:100 to 45:100 in order to facilitate the formation of the layer and to obtain satisfactory methanol impermeability and high ion conductivity. Although methanol permeability can be suppressed more as the amount of the inorganic filler increases, when the amount of the inorganic filler is too large, ion conductivity tends to lower. When the ion exchange resin does not exist, ion conductivity cannot be obtained.

In the ion exchange membrane of the present invention, the pores of the above porous film layer (A) are filled with an ion exchange resin which is preferably identical to the ion exchange resin contained in the above surface layer. Preferably, the ion exchange resin contained in the surface layer and the ion exchange resin in the pores form a continuous phase without an interface. In this case, an ion exchange membrane having high ion conductivity (low membrane resistance) can be obtained.

Figure 2:
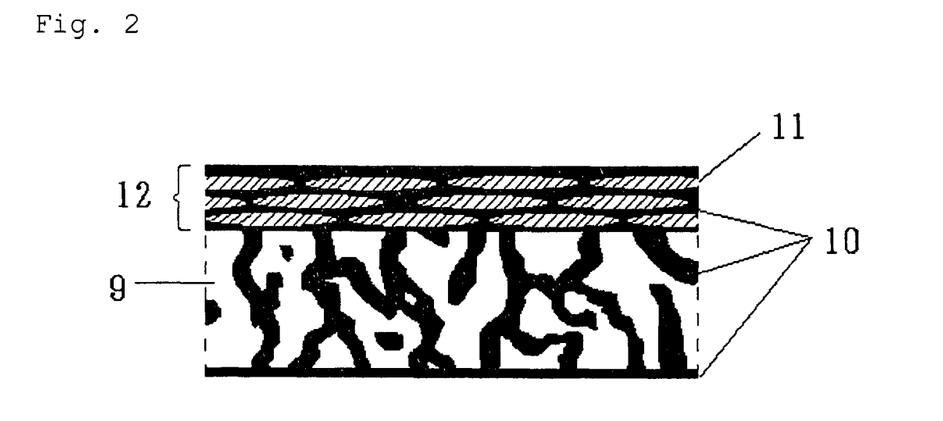
FIG. 2 is a diagram showing the structure of the ion exchange membrane of the present invention.

FIG. 2 is a diagram of the ion exchange membrane of the present invention. With reference to FIG. 2, a further description of the ion exchange membrane is added. In the figure, the size ratio of constituent parts is arbitrary and the size of the ion exchange membrane of the present invention is not shown accurately. That is, the layer 12 which comprises both the ion exchange resin 10 and the inorganic filler 11 is formed on at least one side of the substrate which is the porous film 9. A large number of the pores of the porous film 9 extend from the one side to the other side of the ion exchange membrane, and the ion exchange resin 10 also exists in these pores. In FIG. 2, the surface layer 12 which comprises both the ion exchange resin 10 and the inorganic filler 11 is existent only on one side of the porous film 9 whereas a layer consisting only of the ion exchange resin 10 is existent on the opposite side. The surface layer which comprises both the ion exchange resin and the inorganic filler may also be existent on the opposite side, or may not be existent on the opposite side, that is, the porous film may be exposed as it is. If the surface layer which comprises both the ion exchange resin and the inorganic filler is existent on at least one side of the ion exchange membrane, satisfactory methanol impermeability can be obtained. An ion exchange membrane having the surface layer which comprises both the ion exchange resin and the inorganic filler on both sides can be manufactured easily. The ion exchange resin does not need to be filled in all the pores of the porous film and may not be filled in some of the pores. To obtain large ion exchange capacity, it is preferred that the ion exchange resin should be filled in as many pores as possible. FIG. 2 shows an example where all the pores are filled with the ion exchange resin.

Other components may be contained in a portion where the ion exchange resin 10 is existent in FIG. 2, such as known additives for ion exchange resins and resins other than the ion exchange resin. A small amount of an inorganic filler, particularly an inorganic filler having the longest diameter smaller than the pore diameter of the porous film may be contained in the ion exchange resin in the pores of the porous film 9. The content of the inorganic filler in the pores is generally lower than the content of the inorganic filler in the layer which comprises both the ion exchange resin and the inorganic filler, for example, ⅕ or less, preferably 1/10 or less, particularly preferably 1/100 or less.

A description is subsequently given of the first production process of the present invention.

In the first production process, a suspension comprising an inorganic filler having an average primary particle longest diameter which is 0.1 time or more the average pore diameter of the pores of the porous film and 50 μm or less and a polymerizable monomer which is the raw material of an ion exchange resin or a polymerizable monomer which is the raw material of an ion exchange resin precursor (to be referred to as "suspension 1" hereinafter) is first prepared. The inorganic filler used herein is identical to the above-described inorganic filler.

It is preferred to use a surface treated inorganic filler in order to improve its dispersibility. In general, it is recommended to use a hydrophilized inorganic filler when a polymerizable monomer which is a raw material for an ion exchange resin is used and a hydrophobilized inorganic filler when a polymerizable monomer which is a raw material for the precursor of an ion exchange resin is used.

The polymerizable monomer which is the raw material of an ion exchange resin refers to a polymerizable monomer which is used in the production of a conventionally known ion exchange resin and becomes an ion exchange resin by polymerization. Specific examples of the polymerizable monomer include sulfonic acid monomers such as styrenesulfonic acid, vinylsulfonic acid and α-halogenated vinylsulfonic acid; carboxylic acid monomers such as methacrylic acid, acrylic acid and maleic anhydride, phosphonic acid monomers such as vinylphosphoric acid, salts and esters thereof. Examples of the monomer having an anionic exchange group include amine monomers such as vinylbenzyl trimethylamine and vinylbenzyl triethylamine; nitrogen-containing heterocyclic monomers such as vinylpyridine and vinylimidazole, and salts and esters thereof.

The polymerizable monomer which is the raw material of an ion exchange resin precursor refers to a polymerizable monomer for forming a resin capable of introducing an ion exchange group by polymerization, that is, a resin having a functional group capable of introducing an ion exchange group, which is used in the production of a known ion exchange resin. Examples of the polymerizable monomer include polymerizable monomers having a functional group capable of introducing a cationic exchange group, such as aromatic vinyl compounds including styrene, α-methylstyrene, vinyltoluene, 2,4-dimethylstyrene, p-tert-butylstyrene, α-halogenated styrene and vinylnaphthalene; and polymerizable monomer having a functional group capable of introducing an anionic exchange group such as styrene, vinyltoluene, chloromethylstyrene, vinylpyridine, vinylimidazole, α-methylstyrene and vinylnaphthalene.

In the production process of the present invention, either one of the polymerizable monomer which is the raw material of an ion exchange resin and the polymerizable monomer which is the raw material of an ion exchange resin precursor is used. When the porous film is a polyolefin-based porous film, the polymerizable monomer which is the raw material of an ion exchange resin precursor is preferably used to introduce an ion exchange group thereafter because its permeability into the pores is high.

A plurality of different polymerizable monomers listed above may be used in combination, or further a crosslinkable monomer or other monomer may be used in combination. An ion exchange resin obtained by blending a crosslinkable monomer becomes insoluble and has improved stability advantageously. Examples of the crosslinkable monomer include polyfunctional vinyl compounds such as divinylbenzenes, divinylsulfone, butadiene, chloroprene, divinylbisphenyl and trivinylbenzene; and polyfunctional methacrylic acid derivatives such as trimethylolmethane trimethacrylates, methylene bisacrylamide and hexamethylene dimethacrylamide. In the following description, the polymerizable monomer which is the raw material of an ion exchange resin, the polymerizable monomer which is the raw material of an ion exchange resin precursor, crosslinkable monomer and other optional monomer are generically referred to as "polymerizable monomer".

Preferably, the suspension 1 further contains a polymerization initiator for polymerization which will be described hereinafter. Examples of the polymerization initiator which can initiate the polymerization of the above polymerizable monomer include organic peroxides such as octanoyl peroxide, lauroyl peroxide, t-butylperoxy-2-ethyl hexanoate, benzoyl peroxide, t-butyl peroxyisobutyrate, t-butyl peroxylaurate, t-hexyl peroxybenzoate and di-t-butyl peroxide.

The suspension 1 may further contain known additives for the production of an ion exchange resin by the polymerization of the monomer, such as a solvent and a plasticizer.

To prepare the above suspension 1, for example, a polymerizable monomer, inorganic filler, polymerization initiator and additives which are used as required are weighed, stirred and mixed together by a general mixer or the like. As for the ratio of the inorganic filler to the polymerizable monomer, the amount of the inorganic filler is preferably 1 to 70 parts by weight, more preferably 1 to 45 parts by weight based on 100 parts by weight of the polymerizable monomer in order to adjust the content of the inorganic filler in the surface layer comprising the inorganic filler and the ion exchange resin and existent in the porous film to the above value. The amount of the inorganic filler in the surface layer comprising the inorganic filler and the ion exchange resin tends to become larger than the amount of the inorganic filler contained in the suspension. Further, as for the polymerizable monomer, the amount of the crosslinkable monomer is preferably 0.1 to 50 parts by weight, particularly preferably 1 to 40 parts by weight and the amount of other polymerizable monomer is preferably 0 to 100 parts by weight based on 100 parts by weight of the polymerizable monomer which is the raw material of an ion exchange resin or the polymerizable monomer which is the raw material of an ion exchange resin precursor. The amount of the polymerization initiator is preferably 0.1 to 20 parts by weight, particularly preferably 0.5 to 10 parts by weight based on 100 parts by weight of the polymerizable monomer. When a plasticizer is used, it can be used in an amount of 0 to 50 parts by weight based on 100 parts by weight of the polymerizable monomer.

The above suspension 1 is contacted to the porous film in order to infiltrate the suspension 1 containing the polymerizable monomer into the pores of the porous film. The porous film has pores having an average pore diameter of 0.01 to 2 μm as described above. To contact the suspension 1, the suspension 1 is applied to or sprayed on the porous film, or the porous film is immersed in the suspension 1. By contacting the suspension 1 to the porous film, the polymerizable monomer and a component dissolved in the polymerizable monomer out of the optional components which have been mixed as required infiltrate into the pores of the porous film. When an inorganic filler having an average primary particle longest diameter which is 0.1 time or more the average pore diameter of the pores of the porous film and 50 μm or less is used as the inorganic filler, the inorganic filler rarely infiltrates into the pores of the porous film, thereby making it possible to form a layer comprising the inorganic filler, polymerizable monomer and optional components on the porous film. The reason that a filler having a smaller diameter than the pore diameter does not infiltrate into the pores is assumed to be that the filler particles agglomerate into larger secondary particles. In the case of immersion, since the polymerizable monomer remaining on the surface of the porous film continues to infiltrate into the pores even after the porous film is pulled up, immersion does not need to be continued until it completely infiltrates into the pores. The immersion time is generally 0.1 to ten-odd seconds although it depends on the type of the porous film and the composition of the suspension.

Subsequently, the polymerizable monomer is polymerized. This polymerization method is not particularly limited and any known polymerization method may be used to polymerize the polymerizable monomer. In general, polymerization by using a polymerization initiator which is the above peroxide and by heating is preferred because its operation is easy and the polymerizable monomer can be polymerized relatively uniformly. To prevent polymerization from being impeded by oxygen and obtain surface smoothness, polymerization is preferably carried out after the exposed surface is covered with a polyester film or the like. Further, by covering the exposed surface with a film, an excess of the suspension is removed, whereby a thin homogeneous ion exchange membrane can be obtained. The polymerization temperature for thermal polymerization is, for example, 50 to 150° C., preferably 60 to 120° C. When a solvent is contained in the suspension 1, the solvent is preferably removed before polymerization.

The film thus obtained by polymerization becomes the ion exchange membrane of the present invention as it is when a polymerizable monomer which is the raw material of an ion exchange resin is used. When a polymerizable monomer which is the raw material of an ion exchange resin precursor is used, an ion exchange group must be introduced into the polymer of the polymerizable monomer to convert it into an ion exchange resin. The method of introducing the ion exchange group is not particularly limited and any known method may be used. The type of the ion exchange group to be introduced is suitably selected according to purpose. Sulfonation, chlorosulfonation, phosphonation or hydrolysis is carried out to obtain a cationic exchange resin whereas amination or alkylation is carried out to obtain an anionic exchange resin. Thus, a desired ion exchange group can be introduced. By introducing the ion exchange group, the ion exchange membrane of the present invention can be obtained.

A description is subsequently given of the second production process of the present invention.

In the second process for producing an ion exchange membrane of the present invention, an ion exchange resin or a precursor thereof in place of the polymerizable monomer used in the above first production process and a solvent are used. In other words, the polymerization of the polymerizable monomer is carried out before it is contacted to the porous film. Since the ion exchange resin or precursor thereof does not infiltrate into the pores of the porous material as it is in this method, a solution must be prepared by dissolving it in a solvent. The inorganic filler has been described above.

Any known ion exchange resin may be used if it can be dissolved in a solvent. However, the ion exchange resin is preferably a hydrocarbon-based ion exchange resin as described above. The ion exchange resin precursor is a resin which can be converted into an ion exchange resin by introducing a known ion exchange group and is soluble in the solvent used. Specific examples of the ion exchange resin precursor include engineering plastics such as polystyrene, polyaryl ether, polysulfone, polyether sulfone, polyether ether ketone, polyphenylene oxide and polyimide, and elastomers such as polystyrene-block-poly(ethylene-co-butylene)-block-polystyrene copolymer.

The solvent can dissolve the above ion exchange resin or precursor thereof and is suitably selected from known solvents. Examples of the solvent include water, acetone, dichloroethane, chloroform, methanol, ethanol, 1-propanol, 2-propanol, methyl ethyl ketone, acetonitrile, nitromethane, tetrahydrofuran, dioxane, N,N-dimethylformamide and toluene. These solvents may be used alone or in combination of two or more. An organic solvent is preferred from the viewpoint of removal ease.

As for the mixing ratio of the above inorganic filler, ion exchange resin or precursor thereof and solvent in the suspension (suspension 2), the amount of the inorganic filler is preferably 1 to 70 parts by weight, particularly preferably 1 to 45 parts by weight and the amount of the organic solvent is preferably 10 to 500 parts by weight, particularly preferably 20 to 200 parts by weight based on 100 parts by weight of the ion exchange resin or precursor thereof when moldability at the time of production and the properties other than methanol barrier properties of the finally obtained ion exchange membrane are taken into consideration. Other components may be optionally mixed with the suspension 2, such as a polymerizable monomer whose examples have been enumerated for the above first production process and a plasticizer. Examples of the plasticizer include dibutyl phthalate, dioctyl phthalate, dimethyl isophthalate, dibutyl adipate, triethyl citrate, acetyl tributyl citrate and dibutyl sebacate.

The suspension 2 is contacted to the porous film in the same manner as in the above first production process to infiltrate the ion exchange resin or precursor thereof, organic solvent and a component soluble in the organic solvent out of the optional components into the pores of the porous film.

Subsequently, the used solvent must be removed in the second production process. To remove the solvent, any known solvent removing technique such as natural drying, vacuum drying, drying by heating or drying under reduced pressure may be used.

When the ion exchange resin is used, the ion exchange membrane of the present invention is obtained by removing the above solvent. When the ion exchange resin precursor is used, an ion exchange group must be introduced into the precursor to convert it into an ion exchange resin. To convert the precursor into an ion exchange resin, the above techniques enumerated for the first production process can be employed. The ion exchange membrane of the present invention can be obtained by converting the precursor into an ion exchange resin.

The content of the ion exchange group in the ion exchange resin in the ion exchange membrane obtained by the above first or second production process is desirably adjusted to achieve an ion exchange capacity of preferably 0.2 to 5.0 mmol/g, particularly preferably 0.5 to 3.0 mmol/g in order to reduce the electric resistance of the obtained ion exchange membrane. To suppress a reduction in the conductivity of protons caused by drying, the water content is preferably 5% or more, more preferably 10% or more. The water content is generally maintained at about 5 to 90%. In order to obtain the above range of water content, a known method, for example, the selection of the type of the ion exchange group or the control of the ion exchange capacity and the degree of crosslinking can be used to control the water content.

Since the above thin porous oriented film having high strength can be used as a substrate, the electric resistance in a sulfuric acid aqueous solution having a concentration of 3 mol/l of the ion exchange membrane of the present invention obtained by the above production process can be reduced to 0.30 $\Omega \cdot cm^2$ or less, further to 0.15 $\Omega \cdot cm^2$ or less by adjusting the ion exchange capacity of the hydrocarbon-based ion exchange resin. Even when the inner layer is a porous oriented film, the ion exchange resin is filled into the pores of the porous film well, thereby making it possible to greatly reduce the methanol permeability to an extremely low level, for example, a methanol permeability in a 50% methanol solution at 25° C. of $1.0 \times 10^3$ g·m$^{-2}$·24 hr$^{-1}$·atm$^{-1}$ or less, particularly 0.2 to $0.8 \times 10^3$ g·m$^{-2}$·24 hr$^{-1}$·atm$^{-1}$. As the ion exchange membrane of the present invention has low methanol permeability, when it is used as a diaphragm for a direct methanol type fuel cell, it is possible to prevent methanol supplied into the fuel chamber and the oxidizing agent chamber from permeating through the diaphragm to be diffused into the opposite chamber and to obtain a high output cell. In this case, when anion exchange membrane having a layer containing an inorganic filler and an ion exchange resin only on one side is used, the layer is preferably arranged on the fuel chamber side. In general, a direct methanol type fuel cell which comprises the ion exchange membrane of the present invention manufactured by the production process of the present invention as a diaphragm for a methanol type fuel cell has a structure shown in FIG. 1. However, the ion exchange membrane of the present invention can be used in a direct methanol type fuel cell having other known structure.

EXAMPLES

The following Examples and Comparative Examples are provided for the purpose of further illustrating the present invention but are in no way to be taken as limiting. The characteristic properties of the cation exchange membranes shown in Examples and Comparative Examples were measured by the following methods.

(1) Cation Exchange Capacity and Water Content;

The cation exchange membrane was immersed in a 1 mol/l HCl aqueous solution for 10 hours or more to be converted into a hydrogen ion type exchange membrane and then into a sodium ion type exchange membrane with a 1 mol/l NaCl aqueous solution to determine the amount (A mol) of free hydrogen ions with a potential difference titration device (COMTITE-900 of Hiranuma Sangyo Co., Ltd.). The same cation exchange membrane was immersed in a 1 mol/l HCl aqueous solution for 4 hours or more, fully rinsed with ion exchange water and taken out from the ion exchange water, and water on the surface of the membrane was wiped off with tissue paper or the like to measure its weight (W g) while it was wet. Thereafter, the membrane was dried at 60° C. for 5 hours under reduced pressure to measure its weight (D g). The cation exchange capacity was obtained from the following equation based on the above measurement values.

$$\text{Cation exchange capacity} = A \times 1,000/D \text{ [mmol/g-dry weight]}$$

$$\text{Water content} = 100 \times (W-D)/D \text{ [\%]}$$

(2) Electric Resistance

The cation exchange membrane was placed at the center of a double-chamber cell having platinum electrodes, and the cell was filled with a 3 mol/l sulfuric acid aqueous solution at 25° C. A luggin capillary was installed on both sides of the cation exchange membrane for liquid-junction with a reference electrode by a salt bridge. A potential (aV) when a current of 100 mA/cm$^2$ was caused to flow with the sandwiched membrane and a potential (bV) when a current of 100 mA/cm$^2$ was caused to flow without sandwiching the membrane were measured. The electric resistance of the cation exchange membrane was obtained from the following equation.

$$\text{Electric resistance} = 1,000 \times (a-b)/100 \text{ [}\Omega \cdot cm^2\text{]}$$

(3) Heat Resistance (Shrinkage Factor)

A measurement sample film which had been pre-dried in a drier at 50° C. for 1 hour was immersed in ion exchange water at 90° C. for 4 hours and taken out from the ion exchange water to measure its size in order to obtain its shrinkage factor from the following equation.

$$S = 100 \times (La-Lb)/La$$

S: shrinkage factor (%)
La: length of film dried in drier at 50° C. (cm)
Lb: length of film after 4 hours of immersion in ion exchange water at 90° C. (cm)

(4) Methanol Permeability

To measure methanol permeability, a liquid permeation tester employing a differential pressure method based on JIS K7126A was used. The cation exchange membrane used for measurement was impregnated with 50% methanol aqueous solution at 25° C. for 30 minutes and set in a liquid permeation tester. The amount of methanol which has permeated through the cation exchange membrane was measured with a gas chromatogram. The liquid used for the measurement was 50% methanol maintained at 25° C. The methanol permeability was obtained from the following equation.

$$Q = q \times 76 / (a \times t \times Pa)$$

Q: methanol permeability (g/m$^2$·24 hr·atm)
q: amount of permeated methanol
t: measurement time
a: methanol permeated area
Pa: methanol partial pressure (5) Output Voltage of Fuel Cell A mixture of carbon black carrying 30 wt % of platinum having an average particle diameter of 2 nm as a catalyst and a 5% solution of sulfonated polystyrene-block-poly(ethylene-co-butylene)-block-polystyrene copolymer (cation exchange capacity of 0.9) dissolved in organic solvent (1-propanol:dichloromethane:tetrahydrofuran≈94 wt %:2 wt %:4 wt %) was first applied to the both surfaces of the cation exchange membranes to be measured and dried at 80° C. for 4 hours under reduced pressure, and the above film products were thermally fixed to the cation exchange membrane at 100° C. and a pressure of 5 MPa for 100 sec and left at room temperature for 2 minutes to obtain a laminate consisting of the cation exchange membrane and gas diffusion electrodes. The obtained laminate was sandwiched between carbon paper electrodes having a thickness of 200 μm and a porosity of 80% and set in a fuel cell having a structure shown in FIG. 1. A generation test was carried out by setting the fuel cell temperature to 25° C. and supplying a 10% methanol aqueous solution to the fuel electrode side and oxygen having atmospheric pressure to the oxidizing electrode side at a rate of 200 ml/min to measure the terminal voltage of the cell at current densities of 0 A/cm$^2$, 0.1 A/cm$^2$ and 0.3 A/cm$^2$. In FIG. 1, reference numeral 1 denotes a cell interstructure, 2 fuel flow hole, 3 oxidizing gas flow hole, 4 diffusion electrode on the fuel chamber side, 5 gas diffusion electrode on the oxidizing agent chamber side, 6 solid polymer electrolyte, 7 fuel chamber and 8 oxidizing agent chamber.

(6) Evaluation of Durability

After the measurement of the above output voltage, a continuous generation test was carried out at 25° C. and a current density of 0.1 A/cm$^2$, and output voltage was measured after 250 hours to evaluate the durability of the cation exchange membrane.

(7) Measurement of Thickness of Layer Comprising Inorganic Filler and ion Exchange Resin and Content of Inorganic Filler The thickness of the layer comprising an inorganic filler and an ion exchange resin was measured by the observation of the section of the ion exchange membrane through a scanning electron microscope and the elemental analysis of the ion exchange membrane with an electron probe microanalyzer. Further, the content of the inorganic filler in the layer was calculated by elemental analysis.

Examples 1 to 7

Monomers were mixed with a silicate as an inorganic filler having an average primary particle longest diameter which was 0.1 time or more the average pore diameter of the pores of a porous film and 50 μm or less based on composition shown in Table 1 to obtain a mixture (suspension), 400 g of the obtained mixture was added to a 500 ml glass container, and a 20 cm×20 cm polyethylene (PE, weight average molecular weight of 250,000) porous oriented film (film thickness of 25 μm, porosity of 40%, average pore diameter of 0.02 μm) was immersed in the mixture at 25° C. and atmospheric pressure for 10 minutes to impregnate the pores of the porous film with the monomer composition. The inorganic filler A was montmorillonite which is a lamellar silicate having an average particle diameter of 2.0 μm and an aspect ratio of 200 to 1,000 ("S-BEN" manufactured by Nihon Yuki Nendo K.K., treated with tetraalkylammonium), the inorganic filler B was hectorite which is a lamellar silicate having an average particle diameter of 2.0 μm and an aspect ratio of 200 to 1,000 ("SAN" manufactured by Co-op Chemical Co., Ltd., treated with tetraalkylammonium), the inorganic filler C was mica which is a lamellar silicate having an average particle diameter of 4.2 μm and an aspect ratio of 200 to 1,000 ("4CD-Ts" manufactured by Topy Industries Ltd., treated with tetraalkylammonium), and the inorganic filler D was spherical silica having an average particle diameter of 0.02 μm ("HM-20L" manufactured by Tokuyama Corp., treated with hexamethyldisilazane).

After the above porous film was taken out from the monomer composition and covered with a 100 μm-thick polyester film on both sides as a release agent, it was thermal polymerized at 80° C. under a nitrogen pressure of 3 kg/cm$^2$ for 5 hours. The obtained film product was immersed in a 1:1 mixture of 98% concentrated sulfuric acid and chlorosulfonic acid having a purity of 90% or more at 40° C. for 45 minutes to obtain a sulfonic acid type cation exchange membrane. The thickness, cation exchange capacity, water content, electric resistance, heat resistance, methanol permeability constant, fuel cell output voltage and durability of the thus obtained sulfonic acid type cation exchange membrane were measured. The results are shown in Table 2. The layer comprising an inorganic filler and an ion exchange resin was formed on both sides of the porous film when the ion exchange membrane was observed through an electron microscope (Table 2 shows the thickness of the layer on one side). The existence of the inorganic filler in the pores of the porous film used as a substrate was not observed and it was confirmed that the inorganic filler was contained in an amount of 0.01% at the best.

TABLE 1

| Example No. | Inorganic filler[1] | Composition (parts by weight) | | | |
|---|---|---|---|---|---|
| | | St[2] | DVB[3] | PO[4] | Inorganic filler |
| 1 | A | 80 | 20 | 5 | 1 |
| 2 | A | 80 | 20 | 5 | 3 |
| 3 | A | 80 | 20 | 5 | 5 |
| 4 | B | 80 | 20 | 5 | 3 |
| 5 | C | 80 | 20 | 5 | 3 |
| 6 | A | 70 | 30 | 5 | 3 |
| 7 | D | 80 | 20 | 5 | 3 |
| C. Ex. 1 | — | 80 | 20 | 5 | — |
| C. Ex. 2 | D | 80 | 20 | 5 | 3 |

C. Ex. = Comparative Example

[1] inorganic filler inorganic filler A: montmorillonite having an average particle diameter of 2.0 μm and an aspect ratio of 200 to 1,000 inorganic filler B: hectorite having an average particle diameter of 2.0 μm and an aspect ratio of 200 to 1,000 inorganic filler C: mica having an average particle diameter of 4.2 μm and an aspect ratio of 200 to 1,000 inorganic filler D: silica having an average particle diameter of 0.02 μm and an aspect ratio of 1

[2] St: styrene

[3] DVB: divinylbenzene

[4] PO: t-butyl peroxyethylhexanoate

TABLE 2

| Example No. | Film thickness (μm) | Cation exchange capacity (mmol/g-dry weight) | Layer comprising inorganic filler and ion exchange resin | | Water content (%) | Electric resistance (Ω·cm²) |
|---|---|---|---|---|---|---|
| | | | Thickness (μm) | Content of inorganic filler (%) | | |
| 1 | 30 | 2.2 | 2 | 5 | 30 | 0.08 |
| 2 | 31 | 2.1 | 2 | 9 | 34 | 0.09 |
| 3 | 33 | 1.9 | 3 | 14 | 40 | 0.10 |
| 4 | 32 | 2.0 | 2 | 8 | 28 | 0.09 |
| 5 | 32 | 2.0 | 2 | 9 | 29 | 0.10 |
| 6 | 31 | 1.9 | 2 | 8 | 25 | 0.15 |
| 7 | 30 | 2.2 | 2 | 8 | 31 | 0.10 |
| C. Ex. 1 | 29 | 2.3 | — | — | 27 | 0.07 |
| C. Ex. 2 | 30 | 2.0 | 1 | 3 | 37 | 0.28 |

| Example No. | Heat resistance shrinkage factor (%) | Methanol permeability ×10⁻³ (g·m⁻²·24 hr⁻¹·atm⁻¹) | Fuel cell output voltage (V) | | Durability output voltage after 250 hours (V) |
|---|---|---|---|---|---|
| | | | 0 A/cm² | 0.1 A/cm² | |
| 1 | 4.6 | 0.65 | 0.75 | 0.35 | 0.33 |
| 2 | 4.5 | 0.61 | 0.78 | 0.37 | 0.35 |
| 3 | 4.3 | 0.56 | 0.81 | 0.38 | 0.36 |
| 4 | 4.5 | 0.60 | 0.76 | 0.36 | 0.33 |
| 5 | 4.0 | 0.61 | 0.74 | 0.33 | 0.31 |
| 6 | 3.6 | 0.55 | 0.82 | 0.32 | 0.31 |
| 7 | 4.2 | 0.85 | 0.69 | 0.31 | 0.29 |
| C. Ex. 1 | 9.6 | 1.14 | 0.63 | 0.28 | 0.20 |
| C. Ex. 2 | 4.3 | 1.05 | 0.42 | 0.12 | — |

C. Ex. = Comparative Example

Comparative Example 1

The same monomers as in Example 1 were mixed together based on composition shown in Table 1 to obtain a monomer composition containing no silicate. 400 g of the obtained monomer composition was added to a 500 ml glass container, and the same polyethylene porous film as above was immersed in this composition at 25° C. and atmospheric pressure for 10 minutes to fill the monomer composition into the pores of the porous film. Then, the operation of Example 1 was repeated to obtain a sulfonic acid type cation exchange membrane and carry out the same evaluations as in Example 1. The results are shown in Table 2.

Comparative Example 2

The same monomers as in Example 1 were mixed with 5 parts by weight of silica having an average particle diameter of 0.02 μm based on composition shown in Table 1 to obtain a mixture (suspension). 400 g of the obtained mixture was added to a 500 ml glass container, and a polyethylene porous oriented film having a thickness of 25 μm, a porosity of 50% and an average pore diameter of 0.6 μm was immersed in the mixture in place of the polyethylene oriented porous film used in Example 1 at 25° C. and atmospheric pressure for 10 minutes to fill the monomer composition into the pores of the porous film. The operation of Example 1 was repeated to obtain a sulfonic acid type cation exchange membrane. The thickness, cation exchange capacity, water content, electric resistance, heat resistance, methanol permeability and fuel cell output voltage of the obtained sulfonic acid type cation exchange membrane were measured. The results are shown in Table 2. According to the observation of the section of this ion exchange membrane through an electron microscope, the inorganic filler and the ion exchange resin were existent not only on the both sides of the porous film but also in the pores of the porous film in a ratio of 1:1.

Example 8

100 parts by weight of polystyrene-block-poly(ethylene-co-butylene)-block-polystyrene copolymer, 3 parts by weight of silicate A as an inorganic filler and 100 parts by weight of dichloroethane as a solvent were mixed together to obtain a mixture (suspension). 400 g of the obtained monomer composition was added to a 500 ml glass container, and the same polyethylene porous oriented film as above was immersed in the mixture at 25° C. and atmospheric pressure for 10 minutes to fill the polymer solution into the pores of the porous film. The impregnating ability of the polymer solution was 30 sec. Subsequently, the above porous film was taken out from the suspension and heated at 25° C. for 6 hours to obtain a film product. Then, the operation of Example 1 was repeated to obtain a sulfonic acid type cation exchange membrane and carry out the same evaluations as in Example 1. The results are shown in Table 3.

TABLE 3

| Example No. | Film thickness (μm) | Cation exchange capacity (mmol/g-dry weight) | Layer comprising inorganic filler and ion exchange resin | | Water content (%) | Electric resistance ($\Omega \cdot cm^2$) |
|---|---|---|---|---|---|---|
| | | | Thickness (μm) | Content of inorganic filler (%) | | |
| 8 | 29 | 1.4 | 2 | 10 | 27 | 0.10 |

| Example No. | Heat resistance shrinkage factor (%) | Methanol permeability $\times 10^{-3}$ ($g \cdot m^{-2} \cdot 24\,hr^{-1} \cdot atm^{-1}$) | Fuel cell output voltage (V) | | Durability output voltage after 250 hours (V) |
|---|---|---|---|---|---|
| | | | 0 A/cm$^2$ | 0.1 A/cm$^2$ | |
| 8 | 5.7 | 0.68 | 0.77 | 0.36 | 0.33 |

Since the ion exchange membrane of the present invention has low electric resistance and is constituted such that an ion exchange resin is filled in all the pores of a substrate which is a porous film and the openings of the pores are covered with an ion exchange resin layer containing an inorganic filler as described above, its permeability of a liquid, particularly methanol is extremely low. Due to the use of a thermoplastic resin substrate (backing), the ion exchange membrane is superior in dimensional stability, heat resistance and chemical resistance. Further, adhesion between the above thermoplastic resin porous film and the ion exchange resin is extremely strong due to good affinity between them. Therefore, the above excellent methanol impermeability is well maintained even after fuel and oxidizing gas diffusion electrode layers are formed on the surfaces of the film and the resulting laminate is set in a fuel cell to be used for a long time. Accordingly, high cell output can be obtained stably from the direct methanol type fuel cell comprising the membrane of the present invention having the above properties for a long time as a cross-over between fuel and oxygen-containing gas is suppressed. According to the production process of the present invention, the ion exchange membrane of the present invention having the above excellent features can be manufactured easily and efficiently.

The reason that the above effect of the present invention is obtained is that an inorganic filler contained in the hydrocarbon-based ion exchange resin having large hydration power uniformly adheres to the substrate which is a porous film to form a layer that covers the openings of the pores of the porous film, though it is not restricted logically, whereby the permeation of a liquid such as methanol through the porous film can be prevented effectively, and electric resistance is not increased as the ion exchange resin layer containing the inorganic filler is sufficiently thin. Therefore, it is assumed that when the ion exchange membrane of the present invention is used for a fuel cell, it does not reduce the output characteristics of the fuel cell. When a porous sheet or film made of a thermoplastic resin composition, particularly a porous sheet or a porous oriented film made of a hydrocarbon-based thermoplastic resin composition is used as the above substrate, adhesion between the hydrocarbon-based cation exchange resin and the substrate becomes strong due to excellent affinity between them and an anchor effect obtained by filling the hydrocarbon-based ion exchange resin into the pores of the substrate. Consequently, even after the ion exchange membrane of the present invention is thermally fixed to the fuel and oxidizing gas diffusion electrodes and set in a fuel cell to be used for a long time, when it is used as a diaphragm for a direct methanol type fuel cell, the above excellent characteristic properties are well maintained and the obtained direct methanol type fuel cell shows high output stably.

What is claimed is:

1. A process for producing an ion exchange membrane, having a porous film layer and a surface layer existent on at least one side of the porous film comprising the steps of:
   (1) contacting a porous film having pores with an average pore diameter of 0.01 to 2 μm with a suspension containing a hydrophobilized inorganic filler treated with a silane coupling agent or a surface active agent having an average primary particle longest diameter which is 0.1 times or more than the average pore diameter of the pores of the porous film and 50 μm or less and a polymerizable monomer which provides an ion exchange resin precursor when it is polymerized in order to infiltrate the suspension into the pores of the porous film and to adhere the suspension to the surface of the porous film;
   (2) polymerizing the polymerizable monomer contained in the suspension in the pores and on the surface of the porous film; and
   (3) converting the ion exchange resin precursor into an ion exchange resin,
   wherein the pores of the porous film are filled with the ion exchange resin and the surface layer comprises (a) the hydrophobilized inorganic filler and (b) the ion exchange resin.

2. A process for producing an ion exchange membrane having a porous film layer and a surface layer existent on at least one side of the porous film, comprising the steps of
   (1) contacting a porous film having pores with an average pore diameter of 0.01 to 2 μm with a suspension containing a hydrophobilized inorganic filler treated with a silane coupling agent or a surface active agent having an average primary particle longest diameter which is 0.1 times or more than the average pore diameter of the pores of the porous film and 50 μm or less, an ion exchange resin precursor, and a solvent in order to infiltrate the suspension into the pores of the porous film and to adhere the suspension to the surface of the porous film;
   (2) removing the solvent contained in the suspension in the pores and on the surface of the porous film; and
   (3) converting the ion exchange resin precursor into an ion exchange resin,
   wherein the pores of the porous film are filled with the ion exchange resin and the surface layer comprises (a) the hydrophobilized inorganic filler and (b) the ion exchange resin.

* * * * *